United States Patent
Aokage

(10) Patent No.: US 11,727,538 B2
(45) Date of Patent: Aug. 15, 2023

(54) APPARATUS AND METHOD FOR DETERMINING SHARPNESS

(71) Applicant: Canon U.S.A., Inc., Melville, NY (US)

(72) Inventor: Hironori Aokage, Plainview, NY (US)

(73) Assignees: Canon U.S.A., Inc., Melville, NY (US); Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 17/076,244

(22) Filed: Oct. 21, 2020

(65) Prior Publication Data
US 2021/0118121 A1 Apr. 22, 2021

Related U.S. Application Data

(60) Provisional application No. 62/924,541, filed on Oct. 22, 2019.

(51) Int. Cl.
| | | |
|---|---|---|
| G06K 9/00 | (2022.01) | |
| G06T 5/00 | (2006.01) | |
| G06T 7/00 | (2017.01) | |
| G06T 7/70 | (2017.01) | |

(Continued)

(52) U.S. Cl.
CPC ............ *G06T 5/003* (2013.01); *G06T 7/0002* (2013.01); *G06T 7/70* (2017.01); *G06V 10/25* (2022.01);

(Continued)

(58) Field of Classification Search
CPC ...................... G06T 7/0002; G06T 7/70; G06T 2207/30168; G06T 2207/30201; G06V 10/25; G06V 10/462

(Continued)

(56) References Cited

U.S. PATENT DOCUMENTS 9,148,557 B2 * 9/2015 Yasuda .............. H04N 5/23219
10,706,892 B2 * 7/2020 Molgaard ............ G06V 40/168
(Continued)

OTHER PUBLICATIONS

Li, Yafeng, and Ying Lin. "Image sharpness evaluation based on visual importance." 2016 9th International Congress on Image and Signal Processing, BioMedical Engineering and Informatics (CISP-BMEI). IEEE, 2016. (Year: 2016).*
Lu, Qiang, et al. "Automatic region selection for objective sharpness assessment of mobile device photos." 2020 IEEE International Conference on Image Processing (ICIP). IEEE, 2020. (Year: 2020).*

*Primary Examiner* — Jonathan S Lee
(74) *Attorney, Agent, or Firm* — Canon U.S.A., Inc., IP Division

(57) ABSTRACT

An image processing apparatus and method is provided and includes one or more processors; and one or more memories storing instructions that, when executed by the one or more processors, cause the apparatus to receive an input image, determine a position of an estimation area for sharpness estimation based on first information related to a first determination item and not based on second information related to a second determination item if the input image satisfies the first determination item from among a plurality of determination items; determine the position of the estimation area for sharpness estimation based on the second information related to the second determination item if the input image does not satisfy the first determination item and satisfies the second determination item among the plurality of determination items; perform sharpness estimation processing on the determined estimation area; and output a result of the sharpness estimation processing.

20 Claims, 3 Drawing Sheets

(51) Int. Cl.
*G06V 10/25* (2022.01)
*G06V 10/50* (2022.01)
*G06V 20/00* (2022.01)
*G06V 40/16* (2022.01)

(52) U.S. Cl.
CPC .............. *G06V 10/50* (2022.01); *G06V 20/35* (2022.01); *G06V 40/161* (2022.01); *G06T 2207/30168* (2013.01); *G06T 2207/30201* (2013.01)

(58) Field of Classification Search
USPC ......................................................... 382/103
See application file for complete search history.

(56) References Cited

U.S. PATENT DOCUMENTS

| | | | |
|---|---|---|---|
| 2012/0013786 A1* | 1/2012 | Yasuda | H04N 5/232123 348/349 |
| 2012/0082389 A1* | 4/2012 | Sakamoto | H04N 23/611 382/224 |
| 2015/0163391 A1* | 6/2015 | Osawa | H04N 5/2356 348/222.1 |
| 2016/0028946 A1* | 1/2016 | Son | H04N 23/61 348/333.02 |
| 2019/0096441 A1* | 3/2019 | Molgaard | H04N 5/23258 |

* cited by examiner

APPARATUS AND METHOD FOR DETERMINING SHARPNESS

CROSS-REFERENCE TO RELATED APPLICATIONS

This is a nonprovisional patent application that claims the benefit of U.S. Provisional Patent Application Ser. No. 62/924,541 filed on Oct. 22, 2019, the entirety of which is incorporated herein by reference.

BACKGROUND

Field

The present disclosure relates to image processing and, more specifically, to evaluating areas of an image on which image processing is to be performed.

Description of Related Art

Known techniques exist for identifying areas of an image that should undergo further image processing. One type of image processing is determining sharpness of an image and sharp images are generally considered higher quality images. In order to judge the quality of an image based on sharpness, it is important to identify regions in the image to be evaluated for adequate sharpness. A drawback associated with this approach is to use an image characteristic to determine whether the image is of sufficient sharpness. Thus, if this predetermined characteristic in the captured image is not present, there is a difficulty in performing the sharpness evaluation. A system according to the present disclosure remedies these drawbacks by providing a way to efficiently determine regions of an image for performing sharpness evaluation.

SUMMARY

According an embodiment of the present disclosure, an image processing apparatus and method is provided and includes one or more processors; and one or more memories storing instructions that, when executed by the one or more processors, cause the apparatus to receive an input image, determine a position of an estimation area for sharpness estimation based on first information related to a first determination item and not based on second information related to a second determination item if the input image satisfies the first determination item from among a plurality of determination items; determine the position of the estimation area for sharpness estimation based on the second information related to the second determination item if the input image does not satisfy the first determination item and satisfies the second determination item among the plurality of determination items; perform sharpness estimation processing on the determined estimation area; and output a result of the sharpness estimation processing.

According to one embodiment, the position of the estimation area is determined based on a third information related to a third determination item among the plurality of determination items if the input image does not satisfy both of the first and second determination items.

According to another embodiment, it is determined that the input image satisfies the first determination item if autofocus (AF) frame information is associated with the input image, and the position of the estimation area is determined based on a position of the AF frame.

According to a further embodiment, it is determined that the input image satisfies the first determination item if a face is detected within the input image, and the position of the estimation area is determined based on a position of the face. In one instance, it is determined that the input image does not satisfy the first determination item if the AF frame information is not associated with the input image, and determines, as a determination for the second determination item, at least one of: (a) whether a face is detected from the input image, (b) whether an object of a predetermined type other than the face is detected from the input image and (c) whether the input image is a landscape image, and the position of the estimation area is determined based on the second information related to the second determination item if it is determined that the input image satisfies the second determination item. In another instance, it is determined that the input image does not satisfy the first determination item if the face is not detected from the input image, and determines, as a determination for the second determination item, at least one of: (a) whether a AF frame is associated with the input image, (b) whether an object of a predetermined type other than the face is detected from the input image and (c) whether the input image is a landscape image, and the position of the estimation area is determined based on the second information related to the second determination item if it is determined that the input image satisfies the second determination item.

In yet another embodiment, when the input image does not satisfy any of the plurality of determination items, the position of the estimation area is determined based on a saliency map corresponding to the input image. Accordingly, the position of the estimation area is determined, by referencing the saliency map, to be a position according to the saliency map or a central area of the input image.

In another embodiment, category information related to a capturing category is obtained, and a priority of at least one of the plurality of determination items is changed according to the category information. If the category information indicates a portrait capturing mode, it is determined, as a determination for the first determination item, whether a face is detected from the input image and it is determined, as a determination for the second determination item, whether a AF frame information is associated with the input image. If the category information indicates a sport capturing mode, it is determined, as a determination for the first determination item, whether a AF frame information is associated with the input image, and it is determined, as a determination for the second determination item, whether a face is detected from the input image.

In one embodiment, if a autofocus (AF) frame information is associated with the input image and a position of the AF frame has a predetermined relationship with a position of an area of interest based on a saliency map, it is determined that the input image satisfies the first determination item and the position of the estimation area is determined based on the position of the AF frame. If a autofocus (AF) frame information is associated with the input image and a position of the AF frame does not have a predetermined relationship with a position of an area of interest based on a saliency map, it is determined that the input image does not satisfy the first determination item and the position of the estimation area is determined based on information relating to another determination item other than the first determination item among the plurality of determination items. In this instance, the autofocus (AF) frame and the area of interest is overlapped with each other by a predetermined ratio or more, it is determined that the position of the AF frame and the position of the area of interest based on the saliency map has the predetermined relationship.

These and other objects, features, and advantages of the present disclosure will become apparent upon reading the following detailed description of exemplary embodiments of the present disclosure, when taken in conjunction with the appended drawings, and provided claims.

Figure 1:
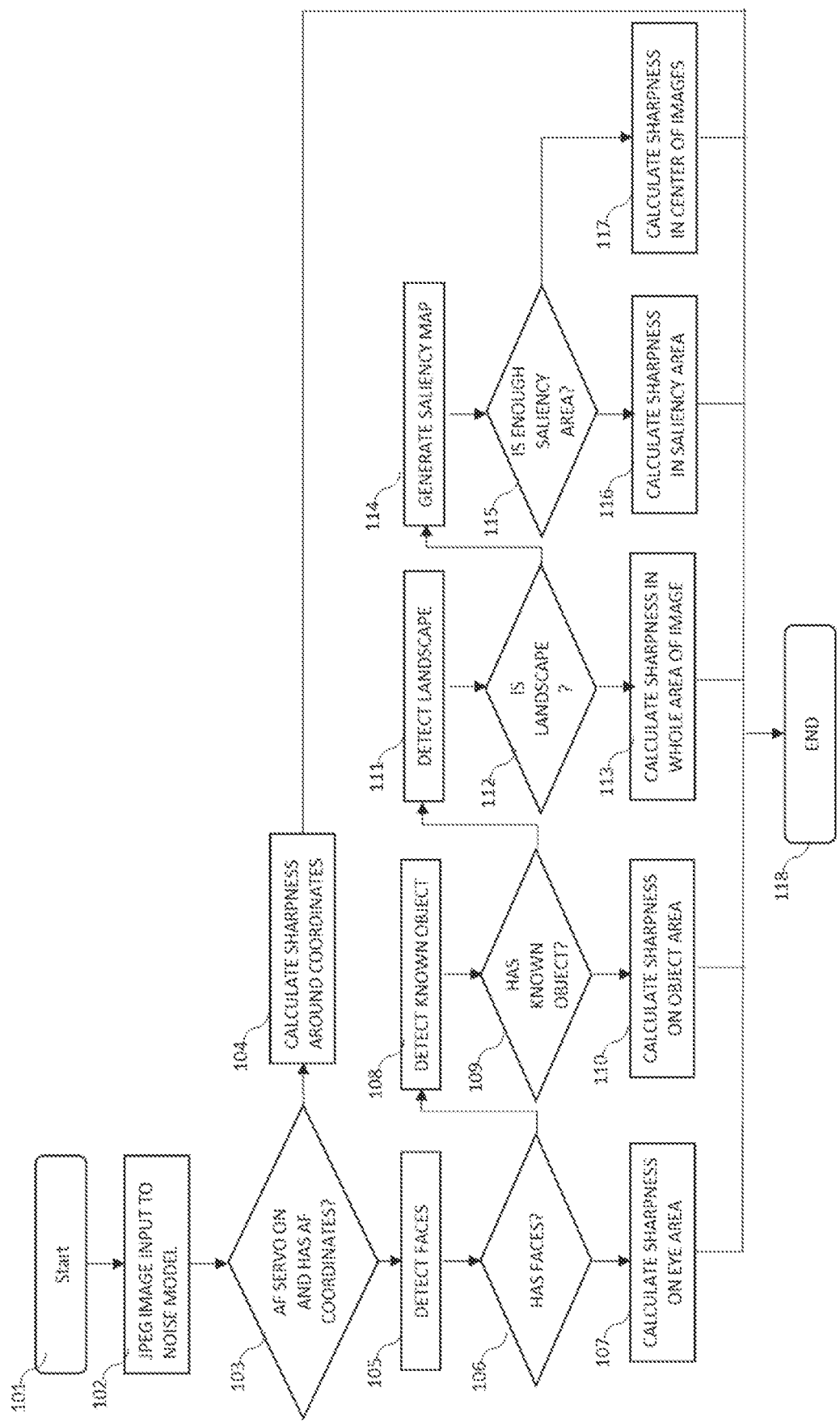
FIG. 1 is a flow diagram detailing an algorithm for implementing the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

The present disclosure advantageously provides an improved mechanism for identifying from with an image, a region on which sharpness processing and evaluation is to be performed. In one example, a region for which sharpness calculation is to be performed is within a predetermined distance from an particular object within the image such as in the area around the eyes of an individual (e.g. human or animal). However, if there are no predetermined objects within the image that typically identify the region where a sharpness calculation should be performed (e.g. no eyes in the images or no face can be detected), there is a difficulty in identifying the region where sharpness needs to be calculated. According to the present disclosure, a priority of multiple detection items used to determine the area of sharpness calculation are set in trained machine learning model (e.g. a neural network or convolutional neural network or the like) that is trained as a sharpness model where information about the manner in which images have been captured is prioritized instead of solely focusing on the characteristics of an image. In one such example, the structure of the model is defined to look at a position of an autofocus frame within the image as it is being captured instead of detecting a face or eyes from within the captured image. While the information from within the captured image are also used to train the sharpness model, the ability to use information during the image capture process improves the ability to determine the region on which sharpness calculation is to be performed.

The present disclosure provides an apparatus and method for image sharpness processing. According to an embodiment, the sharpness processing algorithm includes determining, within an image, a position of an estimation area for sharpness estimation based on a first information related to a first determination item and not based on a second information related to a second determination item if the input image satisfies the first determination item among a plurality of determination items and determining the position of the estimation area for sharpness estimation based on the second information related to the second determination item if the input image does not satisfy the first determination item and satisfies the second determination item among the plurality of determination items. Sharpness estimation processing is performed on the determined estimation area, and a result of the sharpness estimation processing is output. The position of the estimation area is determined based on a third information related to a third determination item among the plurality of determination items if the input image does not satisfy both of the first and second determination items.

In one embodiment, the area on which sharpness estimation is to be performed may be an area in an image that includes information identifying a boundary of an autofocus frame as determined by the image capturing apparatus when the image capture apparatus was capturing the image. Moreover, this is used whether or not other information is present in the image being analyzed. More specifically, the image being analyzed may include one or more image characteristics such as a face, the presence of a predetermined object within the image, and/or a particular type of scene within the image. As such, the algorithm advantageously makes use of the information obtained during image capture when present and other characteristics when that information is not present. This prioritization of different information types between first and third information items advantageously ensures that an area within the image on which sharpness estimation is to be performed can always be found despite the subjective qualities of the image.

In one embodiment, it is determined that the input image satisfies the first determination item if AF (autofocus) frame information is associated with the input image, and the position of the estimation area is determined based on a position of the AF frame within that image. It is determined that the input image satisfies the first determination item if a face is detected from the input image, and the position of the estimation area is determined based on a position of the face. It is determined that the input image does not satisfy the first determination item if the AF frame information is not associated with the input image, and then determines, as a determination for the second determination item one or more one of: (a) whether a face is detected from the input image, (b) whether an object of a predetermined type other than the face is detected from the input image and/or (c) whether the input image is a landscape image. The position of the estimation area is determined based on the second information related to the second determination item if it is determined that the input image satisfies the second determination item. According the disclosure, the object includes one or more of a human body, a portion of a human body, an animal, a vehicle, a sign, a character string and a monument.

According to an embodiment, it is determined that the input image does not satisfy the first determination item if the face is not detected from the input image, and then determines, as a determination for the second determination item, one or more of (a) whether a AF frame is associated with the input image, (b) whether an object of a predetermined type other than the face is detected from the input image and (c) whether the input image is a landscape image. The position of the estimation area is then determined based on the second information related to the second determination item if it is determined that the input image satisfies the second determination item. As such this represents a prioritization of determinations being performed to increase the likelihood that the area within the image one which sharpness evaluation is to be performed is the ideal region.

According to another embodiment, in a case where the input image does not satisfy any of the plurality of determination items, the position of the estimation area is determined based on a saliency map corresponding to the input image and the position of the estimation area is determined, by referencing the saliency map, to be a position according to the saliency map or a central area of the input image. According to an embodiment, the position of the estimation area is determined to be a predetermined position in the input image if it is determined that the input image is a landscape image.

A further embodiment provides for obtaining a category information related to a capturing category, and change a priority of at least one of the plurality of determination items, according to the category information. If the category information indicates a portrait capturing mode, it is determined, as a determination for the first determination item, whether a face is detected from the input image and it is determined, as a determination for the second determination item, whether a AF frame information is associated with the input image. If the category information indicates a sport capturing mode, it is determined, as a determination for the first determination item, whether a AF frame information is associated with the input image, and it is determined, as a determination for the second determination item, whether a face is detected from the input image.

In other embodiments, certain determinations may be skipped. For example, a category information is obtained and a determination relating to one or more of the plurality of determination items is skipped according to the category information. Further, preference information related to user preference is obtained and a priority of at least one of the plurality of determination items is changed or skipped according to the preference information.

In other embodiments, if a AF frame information is associated with the input image and a position of the AF frame has a predetermined relationship with a position of an area of interest based on a saliency map, it is determined that the input image satisfies the first determination item and the position of the estimation area is determined based on the position of the AF frame. Further, if a AF frame information is associated with the input image and a position of the AF frame does not have a predetermined relationship with a position of an area of interest based on a saliency map, it is determined that the input image does not satisfy the first determination item and the position of the estimation area is determined based on information relating to another determination item other than the first determination item among the plurality of determination items. In this manner, if the AF frame and the area of interest is overlapped with each other by a predetermined ratio or more, it is determined that the position of the AF frame and the position of the area of interest based on the saliency map has the predetermined relationship.

An example of an algorithm that determines an area within an image on which sharpness evaluation is to be performed is illustrated in FIG. 1. The processing begins at Step 101.

In Step 102, a type of image is input to a trained machine learning model that has been trained to recognize a plurality of different information items associated with an image including one or more of image capture information, image capture device information, image characteristic information and the like. The model is trained with training data with truth labels to train the model to determine the area in the image on which sharpness estimation is to be performed. In one embodiment, the image is a JPEG image. In another embodiment, the image is a RAW image. In another embodiment, the input image includes metadata that identifies one or more information items obtained from the image capture device and, in some instances, includes information obtained during the image capture process. In Step 103, a determination is made as to whether the input image has been capture according to a predetermined image capture setting and evidence of that capture setting is present in the image. In one embodiment, the determination in S103 considers the image capture setting to be whether or not the image was capture using a particular type of autofocus setting (e.g. AF-servo) and whether the AF frame in the input image is clear. In other words, the apparatus of the present disclosure determines whether the AF frame information is associated with the input image and proceeds to Step 104. If AF servo setting is off or the AF frame is unclear, processing continues at Step 105.

Turning first to Step 104, when the presence of the first information (e.g. an AF frame) is detected within the image, sharpness estimation processing is performed. More specifically, in a predetermined area of the image determined by the boundary of the AF frame, the algorithm calculates how sharp the image is in that area of the AF frame. In one embodiment, the sharpness calculation (e.g. sharpness estimation process) is performed around the area of AF frame by calculating the DCT to obtain a sharpness estimation value for the area. However, the use of DCT as a mechanism for estimating sharpness is described for purposes of example only and there are no limitations what kind of algorithm are used as long as sharpness value can be obtained. Then, the result of calculation is output as sharpness value and forwarded to Step 118.

Turning now to Step 105 which is performed when first information (e.g. AF Frame) is not present, the presence of second information is determined. In one embodiment, the second information is a face of an individual resulting in face detection being performed on the input image since the AF frame is not available or clear. Here, even though deep learning technology is used to detect a face from the input image, there are no limitation which algorithm are used for face detection.

In Step 106, if faces are detected in the input image, processing proceeds at step 107 whereby sharpness estimation processing similar to that discussed in S104 is performed. Face detection performed herein further includes detecting features of the face including eyes, nose, mouth, ears, etc. In Step 107, sharpness value is calculated on the area around eyes in the face. The calculation method is same as Step 104, but the target area to be calculated is different from Step 104. Then processing continues at Step 118. On the other hand, if faces are not detected in the input image, the processing proceeds at Step 108. In Step 108, detection for third information representing one or more image characteristics is performed. In one example, step 108 includes object detection processing to be performed on the input image by deep learning which analyzes the input image for one or more predetermined known objects. For example, the known object can include at least one of human body, animal, vehicle, sign, character string and monument. The detection of these objects is merely exemplary and the model trained to analyze the characteristics of the input image can be trained to identify any type of object. However, it depends on the system used for detection.

In Step 109, if known objects, such as people or animal, are detected by deep learning in the input image, processing continues at Step 110. If there are no known objects detected in the input image, processing continues at Step 111. In Step 110, sharpness value is calculated on an estimation area around object detected in Step 108. The calculation method is same as Step 104 or Step 107, but the target area to be calculated is different from these as the defined area is based directly on a size and position of the object detected in S109.

If, at step 109, third information is not detected and no known objects are present, processing continues at Step 111 whereby detection processing for fourth information representing a type of scene within the image is performed. In one embodiment, in Step 111, landscape detection is performed on the input image using a deep learning. As used herein, the term landscape means the capture of an image of the external or outside environment otherwise known as landscape photography. In Step 112, if the input image scene is detected as a landscape image, the processing continues at Step 113. In Step 113, sharpness value is calculated on at least a portion of the input image. If the input image scene is detected as other scene or even not detected, the processing continues at Step 114. In one embodiment, the processing is performed on an image as a whole or at a predefined location based on scene detection. The calculation method is same as Step 104, Step 107 or Step 110, but the target area to be calculated is different from these. Note that it is not limited to the whole area of the image. That is, the position of the estimation area is determined to be a predetermined position in the input image in step 113 if it is determined that the input image is a landscape image. Then the processing continues at Step 118.

Turning now to Step 114, which is performed in the event that the scene detection processing does not detect a predetermined type of photographic scene such as a landscape, a Saliency map is generated for the input image to visually identify components of the image in order to identify areas of interest within the image around which sharpness estimation processing is to be performed. In Step 115, processing is performed to determine whether a predetermined number of saliency areas are present within the image and, if there are enough saliency areas in the input image, the processing continues at Step 116. In Step 116, sharpness value is calculated on saliency areas of the input image. The calculation method is same as Step 104, Step 107, Step 110 or Step 113, but the target area to be calculated is different from these and is defined by the salient areas on the generated saliency map. More specifically, if the input image does not satisfy any of the plurality of determination items, the position of the estimation area is determined based on a saliency map corresponding to the input image. Then the processing continues at Step 118. In Step 117, sharpness value is calculated on a predetermined area within the image. In one embodiment, the predetermined area is the center area of the input image. The calculation method for sharpness estimation is the same as Step 104, Step 107, Step 110, Step 113 and Step 116, but the target area to be calculated is different from these and instead defined by the predetermined area noted above. In other words, the position of the estimation area is determined, by referencing the saliency map, to be a position according to the saliency map or a central area of the input image. Then the processing continues at Step 118. At the conclusion of step S118, the determination of the sharpness estimation performed on the image is associated with the particular input image and is displayed, on a user interface. In other embodiments, the information representing the sharpness evaluation performed can be used by an image scoring algorithm which determines a quality of an image at least in part on the sharpness of the image.

Figure 2:
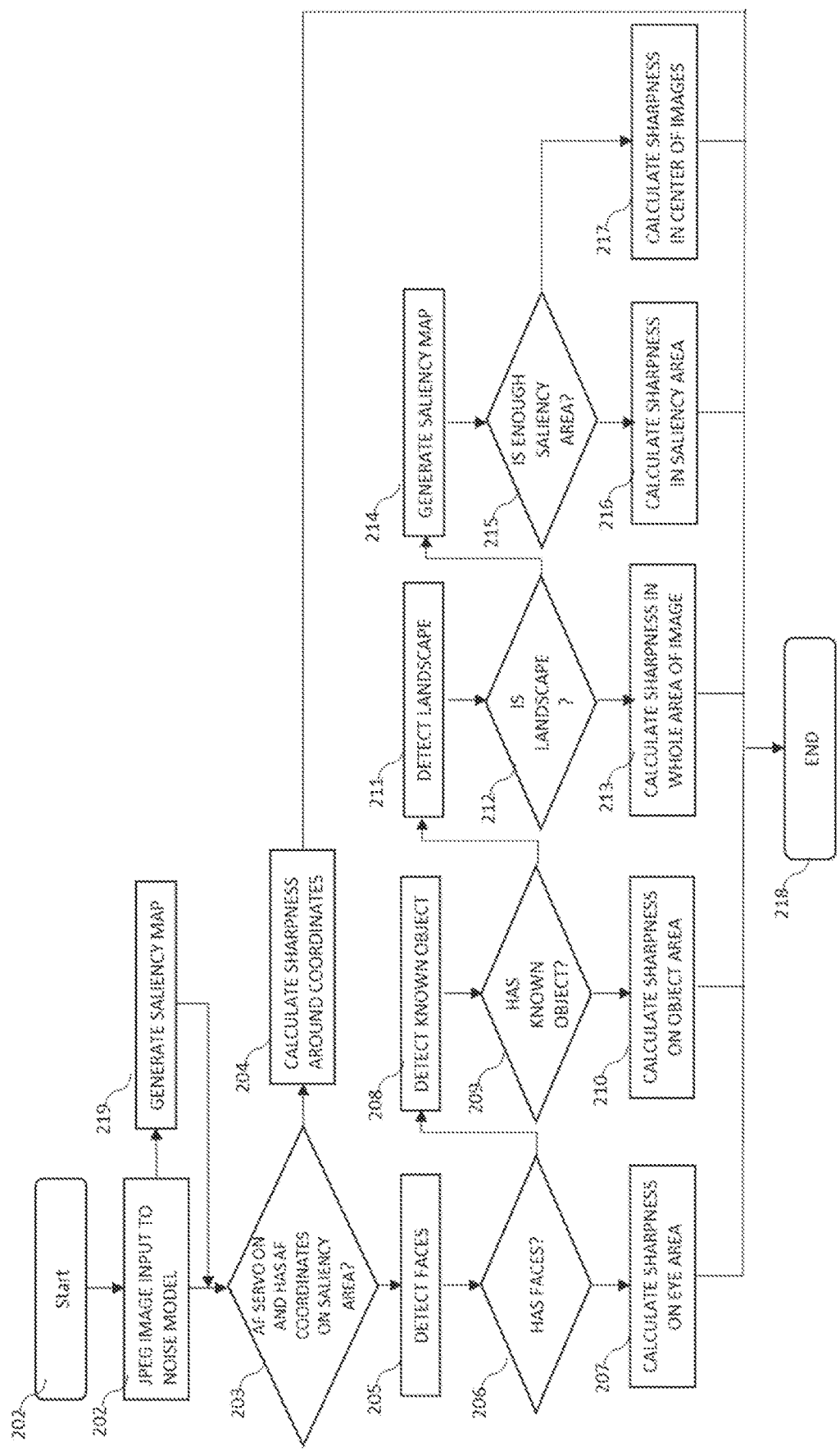
FIG. 2 is a flow diagram detailing an algorithm for implementing the present disclosure.

FIG. 2 illustrates a flow chart of another embodiment of the disclosure. This flowchart is illustrates Noise Model processing. Most of the processes have been described hereinabove in FIG. 1 with the exception of Step 203 and Step 219 in FIG. 2. Regarding the other steps, which have the same function as FIG. 1, all of step numbers are changes from 10× to 20× and the descriptions of which need not be repeated and are instead incorporated herein by reference.

In Step 219, Saliency map are generated with same method of Step 214. Then in Step 203, if "AF Servo is on", "AF coordinate can be obtained", and if it determined that AF coordinates are on the Saliency area, then the processing continues at Step 204. If not, the processing continues at Step 205. In other words, if the AF frame information is associated with the input image and the position of the AF frame has a predetermined relationship with the position of the saliency area based on the saliency map, it is determined that the input image satisfies the first determination item and the position of the estimation area is determined based on the position of the AF frame. Also, if the AF frame information is associated with the input image and a position of the AF frame does not have the predetermined relationship with the position of the saliency area based on the saliency map, it is determined that the input image does not satisfy the first determination item and the position of the estimation area is determined based on information relating to another determination item other than the first determination item among the plurality of determination items. More specifically, if the AF frame and the saliency area is overlapped with each other by a predetermined ratio or more, it is determined that the position of the AF frame and the position of the saliency area based on the saliency map has the predetermined relationship. But it is not limited to this example.

As explained above, the apparatus of the present disclosure determines the position of the estimation area for sharpness estimation based on the first information (e.g. AF frame position) related to the first determination item (AF frame association) and not based on the second information (e.g. face position) related to the second determination item (face detection) if the input image satisfies the first determination item among a plurality of determination items. Also, the apparatus of the present disclosure determines the position of the estimation area for sharpness estimation based on the second information related to the second determination item if the input image does not satisfy the first determination item and satisfies the second determination item among the plurality of determination items. More specifically, the apparatus determines that the input image satisfies the first determination item if AF (autofocus) frame information is associated with the input image, and the position of the estimation area is determined based on the position of the AF frame.

Note that the priority of each determination item is not limited to the examples shown in FIGS. 1 and 2. For example, in one embodiment, the algorithm prioritizes face detection processing as the first information and obtains the AF frame information as second information. In this case, if it is determined that the input image does not satisfy the first determination item if a face is not detected from the input image. Then, the apparatus determines, as the determination for the second determination item, at least one of: (a) whether a AF frame information is associated with the input image, (b) whether an object of a predetermined type other than the face is detected from the input image and (c) whether the input image is a landscape image. After the determination, the apparatus determines the position of the estimation area based on the second information related to the second determination item if it is determined that the input image satisfies the second determination item.

Also, the priority of one or more items can be changed based on a category information related to a capturing category. For example, if the category information of the input image indicates a portrait capturing mode, the face detection is more prioritized than the AF frame information. In other words, if the category information of the input image indicates the portrait capturing mode, it is determined, as a determination for the first determination item, whether a face is detected from the input image and it is determined, as a determination for the second determination item, whether the AF frame information is associated with the input image. On the other hand, if the category information of the input image indicates a sport capturing mode, it is determined, as a determination for the first determination item, whether the AF frame information is associated with the input image, and it is determined, as a determination for the second determination item, whether a face is detected from the input image. Also, one or more determinations listed in the FIGS. 1 and 2 can be skipped based on the category information related to a capturing category. Also, the priority of one or more items can be changed based on a preference information related to a user preference.

Figure 3:
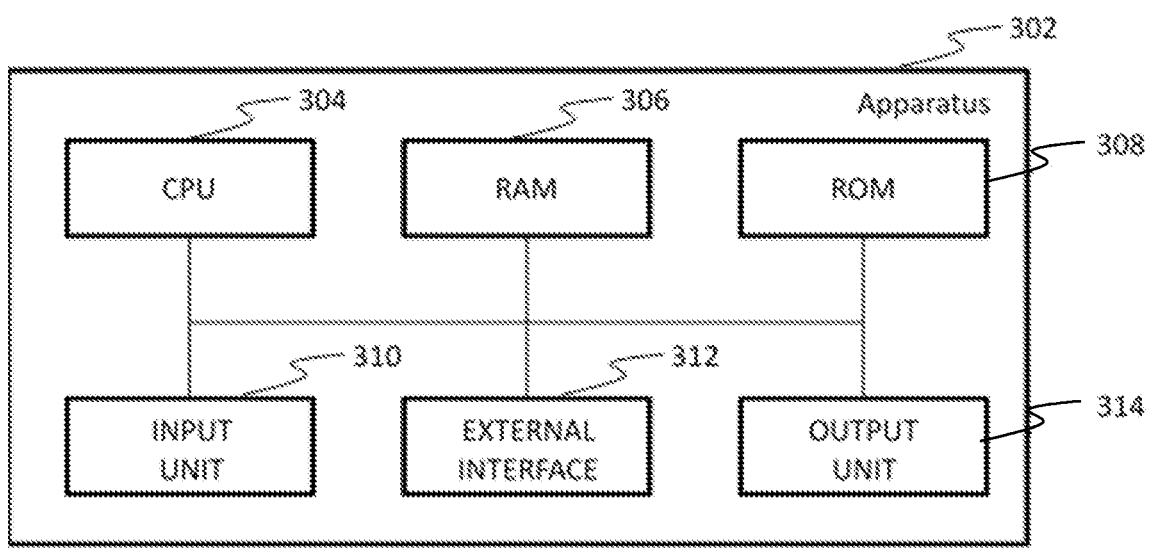
FIG. 3 is block diagram of hardware for implementing the present disclosure.

FIG. 3 illustrates the hardware of an apparatus that can be used in implementing the above described disclosure. The apparatus 302 includes a CPU 304, a RAM 306, a ROM 308, an input unit 310, an external interface 312, and an output unit 314. The CPU 304 controls the apparatus 302 by using a computer program (one or more series of stored instructions executable by the CPU) and data stored in the RAM 306 or ROM 308. Here, the apparatus may include one or more dedicated hardware or a graphics processing unit (GPU), which is different from the CPU 304, and the GPU or the dedicated hardware may perform a part of the processes by the CPU 304. As an example of the dedicated hardware, there are an application specific integrated circuit (ASIC), a field-programmable gate array (FPGA), and a digital signal processor (DSP), and the like. The RAM 306 temporarily stores the computer program or data read from the ROM 308, data supplied from outside via the external interface 312, and the like. The ROM 308 stores the computer program and data which do not need to be modified and which can control the base operation of the apparatus. The input unit 310 is composed of, for example, a joystick, a jog dial, a touch panel, a keyboard, a mouse, or the like, and receives user's operation, and inputs various instructions to the CPU 304. The external interface 312 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 314 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An image processing apparatus comprising:
   one or more processors; and
   one or more memories storing instructions that, when executed by the one or more processors, cause the apparatus to:
   obtain an input image, the input image being an image file that has been captured by an image capture apparatus and includes image capture information corresponding to one or more information items associated with the image capture apparatus that had captured the image file;
   determine a position of an estimation area for sharpness estimation based on first information related to a first determination item and not based on second information related to a second determination item if the input image satisfies the first determination item from among a plurality of determination items;

determine the position of the estimation area for sharpness estimation based on the second information related to the second determination item if the input image does not satisfy the first determination item and satisfies the second determination item among the plurality of determination items;

perform sharpness estimation processing on the determined estimation area; and output a result of the sharpness estimation processing.

2. The apparatus according to claim 1, wherein the position of the estimation area is determined based on a third information related to a third determination item among the plurality of determination items if the input image does not satisfy both of the first and second determination items.

3. The apparatus according to claim 1, wherein it is determined that the input image satisfies the first determination item if autofocus (AF) frame information is associated with the input image, and the position of the estimation area is determined based on a position of the AF frame.

4. The apparatus according to claim 1, wherein it is determined that the input image satisfies the first determination item if a face is detected within the input image, and the position of the estimation area is determined based on a position of the face.

5. The apparatus according to claim 3, wherein it is determined that the input image does not satisfy the first determination item if the AF frame information is not associated with the input image, and determines, as a determination for the second determination item, at least one of: (a) whether a face is detected from the input image, (b) whether an object of a predetermined type other than the face is detected from the input image and (c) whether the input image is a landscape image, and wherein the position of the estimation area is determined based on the second information related to the second determination item if it is determined that the input image satisfies the second determination item.

6. The apparatus according to claim 4, wherein it is determined that the input image does not satisfy the first determination item if the face is not detected from the input image, and determines, as a determination for the second determination item, at least one of: (a) whether a AF frame is associated with the input image, (b) whether an object of a predetermined type other than the face is detected from the input image and (c) whether the input image is a landscape image, and wherein the position of the estimation area is determined based on the second information related to the second determination item if it is determined that the input image satisfies the second determination item.

7. The apparatus according to claim 1, wherein the input image does not satisfy any of the plurality of determination items, the position of the estimation area is determined based on a saliency map corresponding to the input image.

8. The apparatus according to claim 7, wherein the position of the estimation area is determined, by referencing the saliency map, to be a position according to the saliency map or a central area of the input image.

9. The apparatus according to claim 1, wherein the position of the estimation area is determined to be a predetermined position in the input image if it is determined that the input image is a landscape image.

10. The apparatus according to claim 1, further comprising:

obtain a category information related to a capturing category, and change a priority of at least one of the plurality of determination items, according to the category information.

11. The apparatus according to claim 10, wherein if the category information indicates a portrait capturing mode, it is determined, as a determination for the first determination item, whether a face is detected from the input image and it is determined, as a determination for the second determination item, whether a AF frame information is associated with the input image, and wherein if the category information indicates a sport capturing mode, it is determined, as a determination for the first determination item, whether a AF frame information is associated with the input image, and it is determined, as a determination for the second determination item, whether a face is detected from the input image.

12. The apparatus according to claim 1, wherein, if a autofocus (AF) frame information is associated with the input image and a position of the AF frame has a predetermined relationship with a position of an area of interest based on a saliency map, it is determined that the input image satisfies the first determination item and the position of the estimation area is determined based on the position of the AF frame.

13. The apparatus according to claim 1, wherein, if a autofocus (AF) frame information is associated with the input image and a position of the AF frame does not have a predetermined relationship with a position of an area of interest based on a saliency map, it is determined that the input image does not satisfy the first determination item and the position of the estimation area is determined based on information relating to another determination item other than the first determination item among the plurality of determination items.

14. The apparatus according to claim 13, wherein the autofocus (AF) frame and the area of interest is overlapped with each other by a predetermined ratio or more, it is determined that the position of the AF frame and the position of the area of interest based on the saliency map has the predetermined relationship.

15. A method for performing image processing comprising:

obtaining an input image, the input image being an image file that has been captured by an image capture apparatus and includes image capture information corresponding to one or more information items associated with the image capture apparatus that had captured the image file;

determining, by one or more processors, a position of an estimation area for sharpness estimation based on first information related to a first determination item and not based on second information related to a second determination item if the input image satisfies the first determination item from among a plurality of determination items;

determining, by the one or more processors, the position of the estimation area for sharpness estimation based on the second information related to the second determination item if the input image does not satisfy the first determination item and satisfies the second determination item among the plurality of determination items;

performing sharpness estimation processing on the determined estimation area; and outputting a result of the sharpness estimation processing.

16. The method according to claim 15, wherein the position of the estimation area is determined based on a third information related to a third determination item among the plurality of determination items if the input image does not satisfy both of the first and second determination items.

17. The method according to claim 15, wherein it is determined that the input image satisfies the first determination item if autofocus (AF) frame information is associated with the input image, and the position of the estimation area is determined based on a position of the AF frame.

18. The method according to claim 15, wherein it is determined that the input image satisfies the first determination item if a face is detected within the input image, and the position of the estimation area is determined based on a position of the face.

19. The apparatus according to claim 18, wherein it is determined that the input image does not satisfy the first determination item if the AF frame information is not associated with the input image, and determines, as a determination for the second determination item, at least one of: (a) whether a face is detected from the input image, (b) whether an object of a predetermined type other than the face is detected from the input image and (c) whether the input image is a landscape image, and wherein the position of the estimation area is determined based on the second information related to the second determination item if it is determined that the input image satisfies the second determination item.

20. The method according to claim 18, wherein it is determined that the input image does not satisfy the first determination item if the face is not detected from the input image, and determines, as a determination for the second determination item, at least one of: (a) whether a AF frame is associated with the input image, (b) whether an object of a predetermined type other than the face is detected from the input image and (c) whether the input image is a landscape image, and wherein the position of the estimation area is determined based on the second information related to the second determination item if it is determined that the input image satisfies the second determination item.

* * * * *